Patented Nov. 27, 1934

1,981,901

UNITED STATES PATENT OFFICE 1,981,901

ALKALI METAL SALT OF ELAIDYL SULPHURIC ESTER

Hugh Mills Bunbury and Alfred William Baldwin, Blackley, Manchester, England, assignors to Imperial Chemical Industries Limited, a corporation of Great Britain No Drawing. Application June 2, 1933, Serial No. 674,120. In Great Britain June 6, 1932

6 Claims. (Cl. 260—99.12)

According to the present invention we obtain new sulphuric ester salts the aqueous solution of which possess detergent properties to a surprising degree by converting elaidyl alcohol into its sulphuric ester alkali metal salts, that is, by treating it with any known agent capable of transforming an unsaturated alcohol into its sulphuric ester without attacking the unsaturated linkage, and converting the sulphuric ester into an alkali metal salt in any known way.

Elaidyl alcohol, as is known (cf. Toyama, Chemische Umschau, 1924, 31, 13, abstracted in J. Soc. Chem. Ind. 1924, 223B; Andre and Francois, Comptes rendus, 1927, 185, 279, abstracted in British Chemical Abstracts, 1927, 706B), is the trans- isomeride of oleyl alcohol (which is the cis- compound). Oleyl sulphuric ester is described in co-pending application of A. J. Hailwood, Ser. No. 633,451; the new ester obtained in accordance with the present invention is much more potent as a detergent than oleyl sulphuric ester. This surprising fact could not be foreseen, although, having been discovered, it will doubtless provide support for stereochemico-physical generalizations.

The new sulphuric ester salts obtained in accordance with the invention are colorless, odorless, solids, eminently adapted for technical use, as detergents, etc.

The invention is illustrated but not limited by the following example, in which the parts are by weight.

Example 15 parts of elaidyl alcohol, 18 parts of finely ground sodium pyrosulphate and 7.5 parts of dry pyridine are stirred together at 90–95° C. until a sample dissolves to a clear solution in water at 40–50° C. This takes 15 to 20 minutes. The mixture is then stirred into 250 parts of cold water containing caustic soda to convert the resulting sulphuric ester into its sodium salt. Then 50 parts of common salt is added and, after stirring for several hours, the precipitated sulphuric ester salt is filtered off, washed with a little 15% brine, and drained. The so-obtained product is a white odorless paste, readily soluble in warm water, the solution remaining clear even when cold. As already described, the aqueous solution has outstanding detergent potency.

Other tertiary bases may be used in place of pyridine, e. g. dimethylaniline, diethylaniline, quinoline. Secondary bases, such as ethyl-o-toluidine, which, as is generally known, react similarly to tertiary bases, (e. g. in their behaviour towards nitrous acid), may also be used.

Other caustic alkalis may be employed in place of caustic soda, e. g. caustic potash gives the equally effective potassium salt.

We claim:

1. Process for the manufacture of new sulphuric ester salts comprising the treatment of elaidyl alcohol with the addition product of sulphur trioxide and a tertiary base, and converting the resulting sulphuric ester into its alkali metal salt.

2. Process for the manufacture of a new sulphuric ester salt comprising the treatment of elaidyl alcohol with pyridine-sulphuric-anhydride until a water-soluble product is obtained, and then adding dilute caustic alkali and salting out the new sulphuric ester salt.

3. Elaidyl sulphuric ester alkali metal salt having the formula

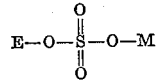

where E stands for the elaidyl radical and M for an alkali metal, the said salt being a substantially colorless, odorless solid exhibiting detergent properties in aqueous solution.

4. Process for the manufacture of new sulphuric ester salts comprising the treatment of elaidyl alcohol with the addition product of sulphur trioxide and a strong organic base capable of reacting with sulphur trioxide, and converting the resulting sulphuric ester into its alkali metal salt.

5. Process for the manufacture of new sulphuric ester salts comprising the treatment of elaidyl alcohol with the addition product of sulphur trioxide and an organic base selected from the group consisting of tertiary bases and secondary bases which behave like tertiary bases toward nitrous acid, and converting the resulting sulphuric ester into its alkali metal salt.

6. The sodium salt of elaidyl sulphuric ester.

HUGH MILLS BUNBURY.
ALFRED WILLIAM BALDWIN.